Figure 8:
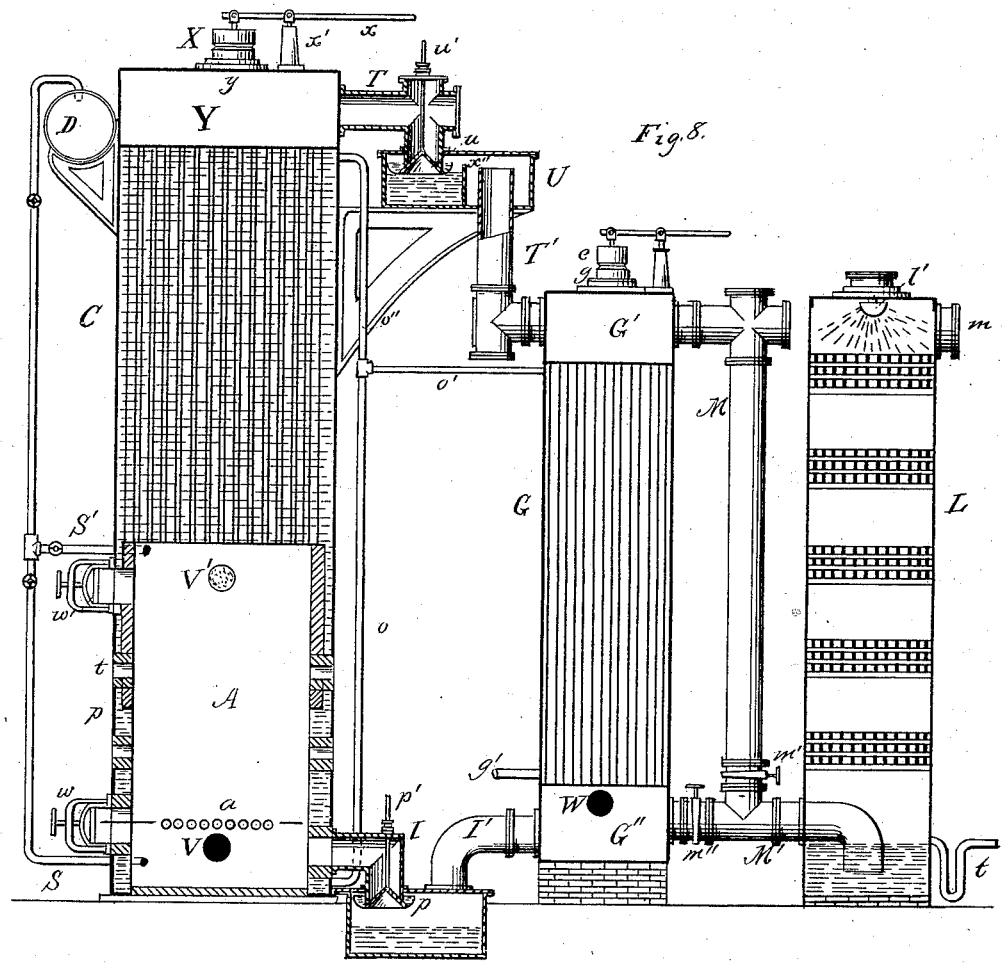

(No Model.) 5 Sheets—Sheet 1.
J. L. STEWART.
APPARATUS FOR MANUFACTURING GAS.
No. 333,691. Patented Jan. 5, 1886.
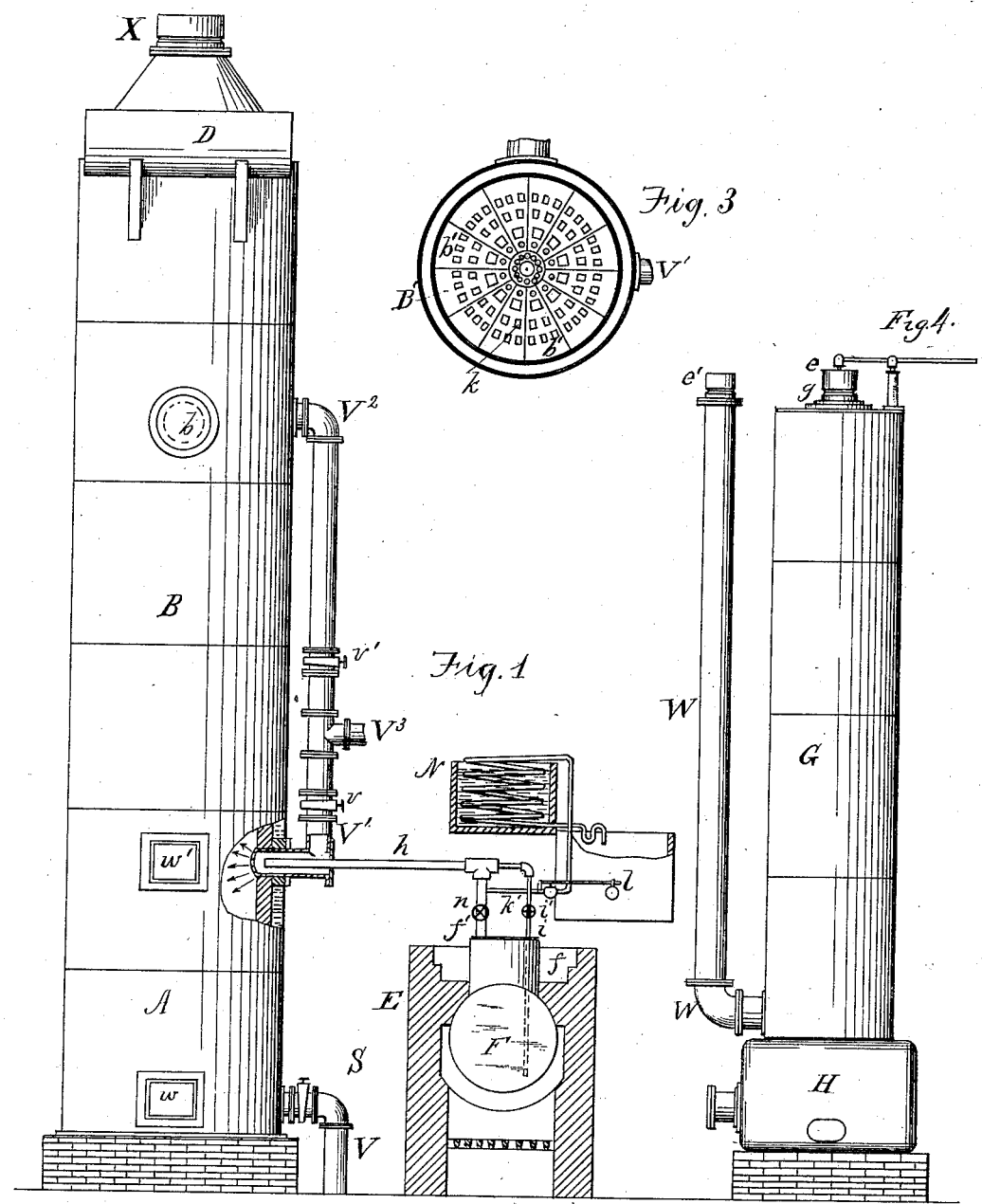

(No Model.)  5 Sheets—Sheet 2.
J. L. STEWART.
APPARATUS FOR MANUFACTURING GAS.
No. 333,691.  Patented Jan. 5, 1886.
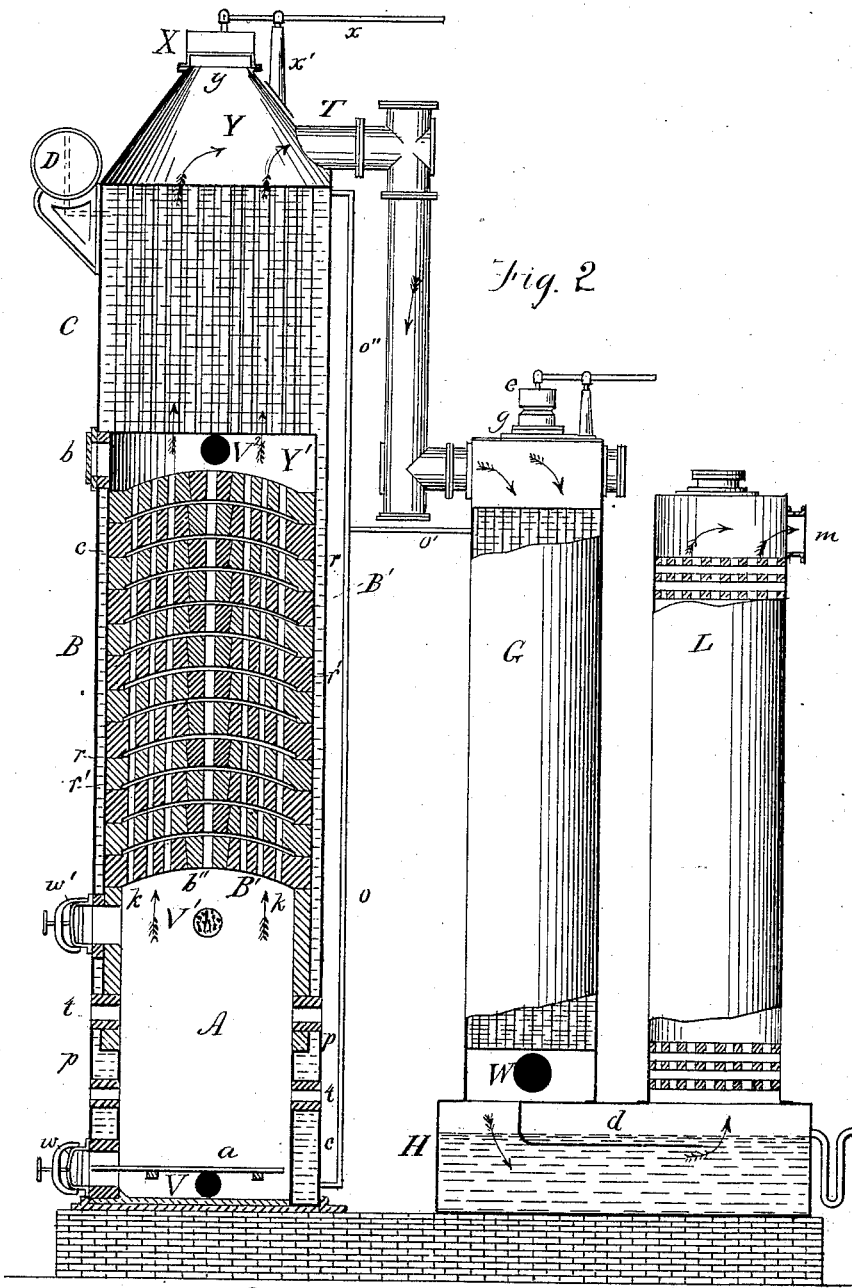

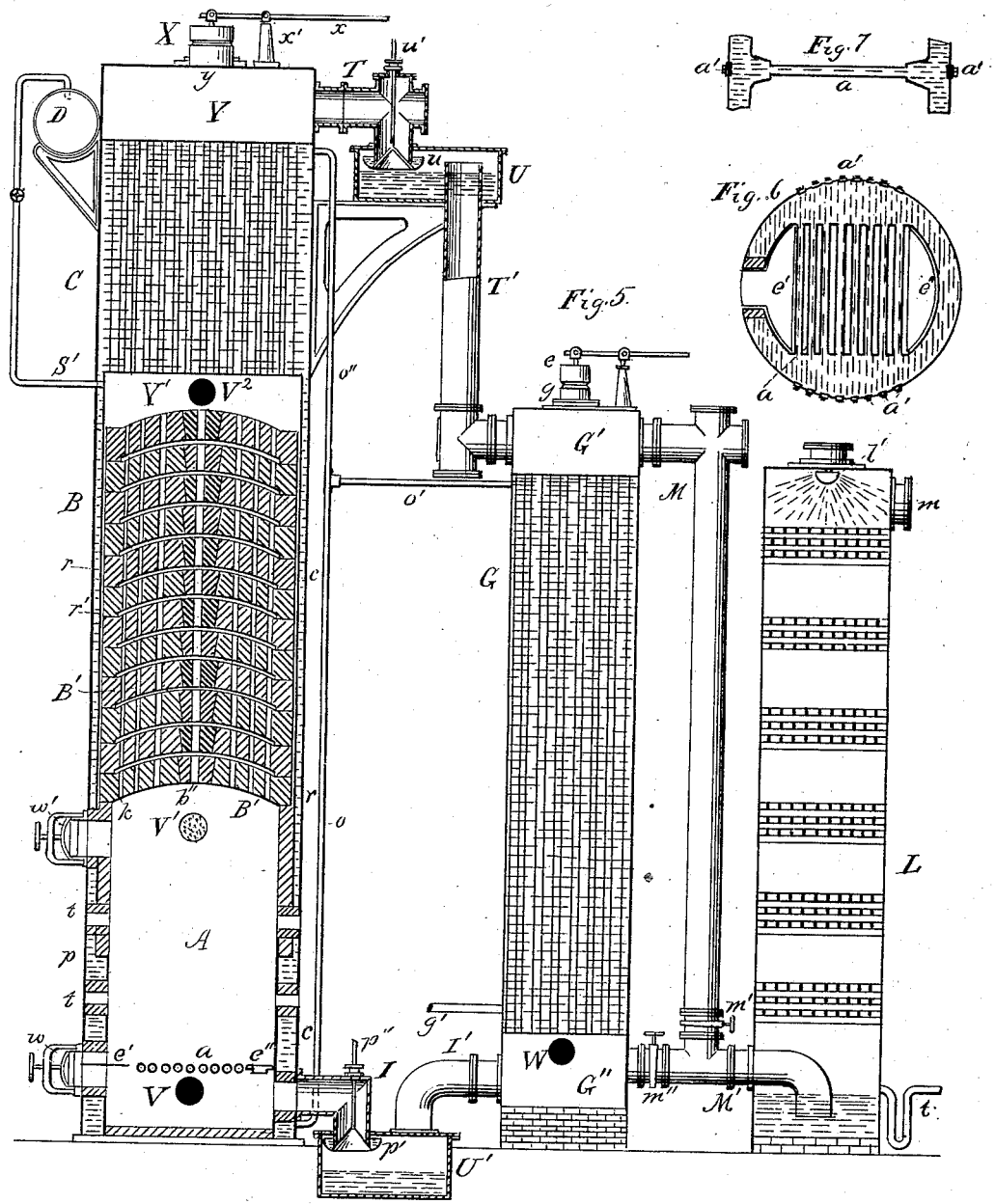

(No Model.)  5 Sheets—Sheet 4.

J. L. STEWART.
APPARATUS FOR MANUFACTURING GAS.

No. 333,691.  Patented Jan. 5, 1886.

Witnesses  Inventor

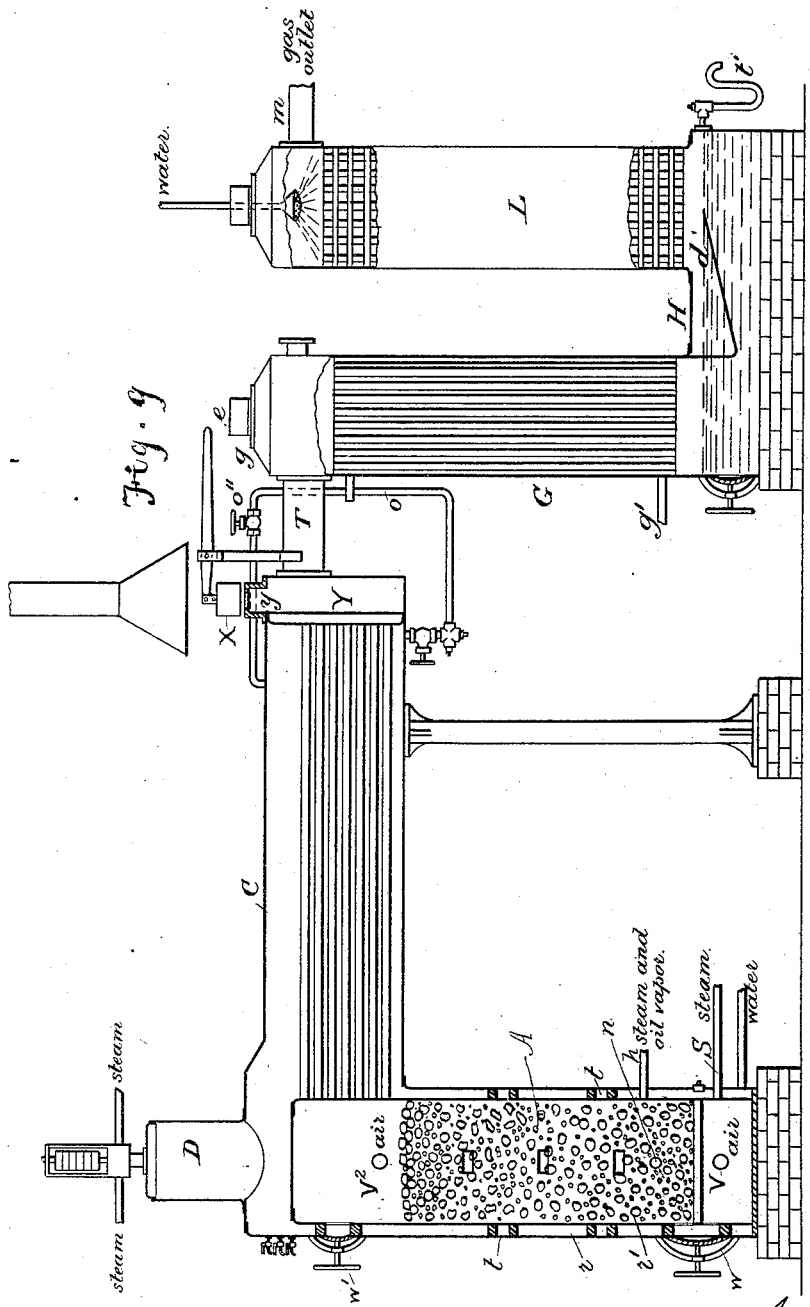

UNITED STATES PATENT OFFICE.

JOHN L. STEWART, OF PHILADELPHIA, PENNSYLVANIA.

APPARATUS FOR MANUFACTURING GAS.

SPECIFICATION forming part of Letters Patent No. 333,691, dated January 5, 1886.

Application filed April 30, 1885. Serial No. 164,050. (No model.)

*To all whom it may concern:*

Be it known that I, JOHN L. STEWART, a citizen of the United States, residing at Philadelphia, in the county of Philadelphia and State of Pennsylvania, have invented certain new and useful Improvements in Apparatus for Manufacturing Gas, of which the following is a specification, reference being had therein to the accompanying drawings.

This invention relates to apparatus for manufacturing illuminating and heating gas, of that kind called "cupola gas-generators," in which steam is decomposed in contact with incandescent fuel, the resulting gas carbureted or enriched with volatile hydrocarbons, and the mixed gas and vapor fixed by contact with heated refractory material in the fixing-chamber of the cupola.

The improvements in the apparatus include the novel construction and arrangement of the refractory brick-work filling of the fixing-chamber, whereby it is made more secure and effective, and can be readily cleaned; also, special devices for vaporizing the oil and supplying the hot vapor or hot oil under pressure in the desired volume to the generator, as hereinafter more fully described; also, the water-jacket and steam-boiler as applied to the generating-cupola; also, certain details of construction, as will be fully described with reference to the accompanying drawings, and as defined in the claims.

In the drawings, Figure 1 represents an elevation of the apparatus with parts in section. Fig. 2 represents a vertical section of the cupola-generator, with the boiler mounted on top and the water-heater and scrubber partly in section. Fig. 3 represents a horizontal section through the fixing-chamber of the cupola. Fig. 4 represents an elevation of the water-heater at right angles to the view in Fig. 2. Fig. 5 represents a vertical longitudinal section of the apparatus, showing modified features of construction. Fig. 6 represents a horizontal section through the cupola, showing the water-circulating grate-bars. Fig. 7 represents a sectional detail of the water-cooled grate. Fig. 8 represents a vertical section of the apparatus of modified form, adapted more particularly to the manufacture of heating-gas, in which the fixing chamber is omitted and replaced by an extended steam-boiler above the fuel-chamber. Fig. 9 represents a longitudinal vertical section of a modified form of apparatus.

The cupola gas-generator is mounted on a foundation of masonry, and is divided into a fuel-chamber, A, at the base, and a fixing-chamber, B, containing a filling of open-work fire-brick composed of numerous independent arches, B', located above the fuel-chamber, and above the fixing-chamber is placed the tubular steam-boiler C, with which is connected at the top the steam-drum D. The fire-brick $b'$, composing the arches B', may be made triangular, or nearly so, having the inner sharp end cut off, so that they will fit against the central key-brick, $b''$. The bricks are all alike formed with passages $k$, and they are set in the successive arches, so that such passages shall all fall in line one above the other and form continuous vertical passages through the fixing-chamber. By this arrangement the passages in the brick-work may be readily cleaned by strong blasts of air or steam, or by rods and brushes. Of course the perforated brick forming the arches may be made of any convenient size and shape and need not reach from the circumference to the central key-brick, as brick of such dimension might not be practical in cupolas of large diameter. The brick, of whatever size and shape, however, may be laid so that the passages of each successive arch shall register or align with those of the arch below.

The perforated brick arches laid one above the other throughout the fixing-chamber, irrespective of the alignment of the perforations or passages, I believe to be novel and a distinct improvement upon the form and arrangement of brick filling heretofore used in the superheating or fixing chamber of cupola gas-generators.

Heretofore a brick arch has been constructed at the base of the fixing-chamber, and the brick filling has been piled in checker-work style upon such arch. This construction has proved inefficient and dangerous, as the bottom arch, unable to sustain the mass of brick above, has given away, allowing the loose brick above to fall into the fuel-chamber. By my arrangement of independent arches I overcome this difficulty and make the fixing-chamber compact and safe. The arches may be formed several inches apart, and this arrangement would be desirable where the perforations were not in line, so as to form continuous passages. The shell of the fuel-chamber A and fixing-chamber or superheater B is formed of two iron casings, $r\ r'$, stayed together by stay-bolts, the inner one, $r'$, being of smaller diameter than the outer one, so as to form a water-jacket, $c$, or part of the steam-boiler between them. In the fuel-chamber the inner casing projects inward, forming offset $p$, and below that point forming the inner wall of the fuel-chamber. The iron water jacket or casing without a brick lining is carried up in the fuel-chamber to or above the clinker-line, or above the line up to which clinker forms in a brick-lined furnace. This iron water-jacket being placed next to the fuel where it is most highly heated prevents the adhesion of clinker to the wall, as explained in patents previously granted to me. The fuel-chamber is lined up with fire-brick above offset $p$, and the fixing-chamber is also lined with fire-brick. The inner casing, $r'$, is riveted to the lower tube-sheet of boiler C, and the outer casing extends from the base of the cupola to the conical top of the boiler, to which it is riveted. The top is made conical, so that the tubes of the boiler may be more readily cleaned. The fuel-chamber A is provided with grate $a$, ash-door $w$, and fuel-door $w'$. An air-blast pipe, V, from a blower connects with the ash-pit, and an air-blast pipe, $V^3$, conveys air from the blower to branch pipes $V'$ and $V^2$, having valves $v$ and $v'$, pipe $V'$ connecting with the top of the fuel-chamber and pipe $V^2$ connecting with the top of the superheating and fixing chamber just below the boiler. A steam-supply pipe, S, connects with blast-pipe V, or at any other convenient place near the base of the fuel-chamber. The gas-outlet pipe T leads from chamber Y at the top of the boiler, and a passage, $y$, formed in the top of such chamber, serves for the escape of waste products of combustion, such passage being closed by a cap, X, to which is attached an operating-lever, $x$, pivotally connected to standard $x'$. A man-hole and cover, $b$, are provided at the top of the fixing-chamber. Gas-take-off pipe T in the apparatus shown in Fig. 2 connects directly with the top of water-heater G, which is provided with tubes for the passage of hot products, and has a smoke-escape pipe, W, leading from its lower end and extending up outside to the top of the heater, as shown in Fig. 4. The heater has at the top an opening, $g$, and a stopper or safety-valve, $e$, and the smoke-pipe has at the top a stopper, $e'$. The heater $i$, is mounted on the water-seal box H, which also serves as a washer, and such box has a plate, $d$, extending from the opening of the heater down below the water-line, so that the gas is caused to traverse through the water.

A scrubber, L, is mounted on the box, and is in open communication therewith at the bottom, and has at the top an outlet-pipe, $m$. It may also have a water-spray pipe or rose-head. A furnace, E, for the oil vaporizer or still is placed adjacent to the cupola, and in such furnace is set the still F, having a vapor-dome, $f$. A vapor-pipe, $f'$, having a valve, $n$, connects with pipe $h$, leading through blast-pipe $V'$ into the top of the fuel-chamber. The inner end of pipe $V'$ is perforated for the purpose of better distributing the hot oil or vapor supplied by pipe $h$. An escape-vapor pipe, $k$, connects with pipe $f'$ and leads to a condensing-worm, N, which has a discharge-pipe at the lower end leading into a storing-tank. Pipe $k$ is provided with a safety-valve and weighted lever, $l$. A pipe, $i$, having valve $i'$, passes down through the dome to near the bottom of the still, and also connects with pipe $h$, and is for the purpose of discharging the heavy oils which accumulate in the bottom of the still, or for supplying hot oil to the generator by means of the pressure of vapor in the top of the still when valve $n$ of the vapor-pipe is closed, or even when it is part open, provided the pressure of vapor in the still is sufficient. An ordinary steam-boiler, adapted to stand a high pressure, may be used for the still, and it is to be heated by a fire on the grate or by coils of steam-pipe placed within it. An excessive pressure of vapor in the still is relieved by means of pipe $k$ and condenser N, the pressure of vapor operating to open the safety-valve, and thus permit the vapor to escape into the condenser, where it is reduced to a liquid condition and allowed to flow to a storage-tank, from which it may again be supplied to the still. Openings $t$ are provided in the walls of the fuel-chamber at different points in the circumference and height for the insertion of clinkering-bars to break and stir up the fuel when bituminous coal is being used in the generator or to detach clinker. These openings are to be closed by tight-fitting caps or plugs.

The cupola generator for carrying out certain operations should be provided with two gas-eduction pipes, one at the top, as above described, and one at the bottom connecting with the ash-pit, as shown in Figs. 5 and 8. The pipe T at the top should preferably connect by a short dip-pipe with the hydraulic seal-box U, and pipe T', projecting up through the bottom of such box and above the water-line therein, connects with chamber G' at the top of heater G. A conical valve having annular cup $u$ and a rod, $u'$, passing through a stuffing-box, as shown, is provided for closing the lower end of pipe T in seal-box U. Pipe I, leading from the ash-pit, connects by a dip-pipe with seal-box U', and such pipe is closed by the valve and cup $p'$, having rod $p''$ passing through a stuffing-box in the upper side of the pipe. Pipe I' connects box U' with the lower chamber, G'', of heater G. Pipe M, having valve m, connects chamber G″ with the base of the scrubber where the end is turned down to dip into a water-seal. Pipe M connects the top chamber, G′, with pipe M′, and is provided with a controlling-valve, m′, as shown. An overflow-trap pipe, t′, connects with the base of the scrubber and with the seal box H, and the seal-box is also provided with a man-hole closed by a cap or plate. A spray-pipe with rose-head l′ supplies water to the top of the scrubber. Water is forced by a pump to the base of the heater through pipe g′, and flows by pipes o′ and o into the water-space c of the generator, and thence up into the boiler C. A pipe, o‴, connecting with pipes o and o′, leads to the top of the boiler for conducting away air or steam from the water-heater G, and thereby provides for the unobstructed and uniform flow of water through the heater and into the base of the water-jacket surrounding the generator. The grate a is preferably composed of hollow bars, as shown in Figs. 5, 6, and 7, connecting with the water-space c of the jacket, so that water will circulate through them, and the outer casing, r, of the shell is provided with openings and screw-plugs a′, adjacent to the ends of the bars, for affording access to place the bars in position in the same manner as the tubes of a boiler are set, or to permit cleaning or tightening of the tubular bars, as required. A dead-plate, e′, is placed adjacent to the door w alongside of the bars, and another dead-plate, e″, is placed at the rear between the bars and furnace-walls. A steam-pipe (not shown in Fig. 5) connects with blast-pipe V, leading into the ash-pit below the grate, and steam-pipe S′ connects with chamber Y′ above the fixing or superheating chamber B.

The generator shown in Fig. 8 is composed simply of a fuel and generating chamber, A, a steam-boiler, C, and the water-jacket, and is more particularly adapted for making water-gas. The fixing-chamber of brick-work is omitted to simplify the construction and lessen the expense, as the oil-vapor may be converted into a fixed gas in the fuel when its heat is sufficiently reduced, as hereinafter explained. The heat, which, in the other forms of generator is stored in the brick-work, is in this form applied to the steam-boiler, and a proportionally higher steam-boiler is used, so that the heat of the products of combustion and of the water-gas may be properly utilized. The connections of this generator with the water-heater G at top and bottom are like those shown in Fig. 5. A steam-pipe, S, connects with the ash-pit, and steam-pipe S′ connects with the top of the fuel-chamber, both connecting by a pipe with steam-drum D. A partition, x″, is placed in seal-box U, to prevent water coming in contact with pipe T′, and thereby cooling it, so that hot gaseous products may pass at a higher temperature into heater G. The stem p″ of lower cone-valve, p′, is hollow, and perforated at its junction with the apex of the valve, and in practice is connected at its outer end with a flexible pipe for supplying steam or water, whereby the valve-stem is protected from overheating when making fuel or water-gas, which is passed off directly from the fuel through eduction-pipe I. The upper valve-stem requires no special means for cooling, since the gaseous products are cooled by passing through the boiler. The cone-valve fits the end of the dip-pipe by a ground joint, and the annular cup containing water forms when it is raised a fluid seal-joint and also cools the end of the pipe.

For a still more economical form of apparatus than that shown in Fig. 8, the heater G may be dispensed with and the top chamber of boiler C connected directly by a pipe, T, having an expansion joint with the base of the scrubber, so as to form a dip-pipe and fluid seal. The gas in such construction, after passing through the scrubber, may pass through a lime-water wash-box of any well-known construction. As such generator has no eduction pipe at the bottom, the oil-vapor should be admitted into the lower part of the fuel after it has been reduced by decomposing steam to the proper temperature, and is passed up through the fuel for conversion into a fixed gas, as more fully hereinafter explained. In the form of apparatus shown in Fig. 9 the fuel-chamber A may be made square or rectangular in cross-section, and the tubular steam-boiler C is arranged horizontally, whereby the tubes may be more readily cleaned. The steam and oil-vapor pipe h connects with the lower portion of the fuel-chamber above the grate-bars, and a separate steam-pipe, S, connects below the grate-bars, whereby heating-gas and illuminating-gas may be generated in the same body of fuel, as hereinafter more fully explained.

The operation of the apparatus represented in Figs. 1 and 2 is as follows: A fire is kindled in chamber A and supplied with fuel, and the air-blast is admitted through pipe V till a bed of incandescent fuel several feet thick is formed. As soon as combustible gas escapes from the fuel the air-blast is admitted through pipe V′ and the gas burned for heating up the fixing-chamber and the steam-boiler above. The hot products pass through the flues of the boiler, and finally escape through pipe T, down through the tubes of heater G, and out through smoke-escape pipe W, the cap e′ being at that time removed, or out through passage y, cap X being removed. While the generating-cupola is being heated up the oil-still, which has been about half filled with oil, is also heated up, and vapor generated is allowed to accumulate under pressure, so that a suitably-large volume of oil-vapor will be held in readiness to carburet to the desired candle-power the large volume of water-gas, which is rapidly generated when steam is first admitted to the incandescent fuel. Petroleum, benzine, or heavy hydrocarbon oils may be used in the still. The fuel in the generator and the brick-work in the fixing-chamber having been heated to the desired temperature, and a suitable volume of oil-vapor having been accumulated in the still under pressure, the air-blasts are shut off, and passage $y$ by cap X or passage W by cap $e'$ are closed, and steam admitted through pipe S to the base of the fuel, by contact with which it is rapidly decomposed and large volumes of hydrogen and carbonic oxide produced. As these gases rise from the fuel the hot oil-vapor is admitted by opening valve $n$ and caused to mingle with and properly carburet them, and the gases and vapor are combined and fixed by passage through the heated fixing-chamber. The hot illuminating-gas passes through the tubular boiler, assisting in raising steam, and flows through pipe T into the water-heater G, through the tubes of which it passes for heating the water, and then passes through the wash-box and scrubber, where it is washed and purified. The manufacture of gas is thus continued till the temperature of the fuel and of the fixing-chamber is reduced too low, when the steam and oil are shut off and the apparatus reheated by the admission of the air-blasts in the usual manner. After heating up the manufacture of gas is resumed as above described. Hot oil may be used for carbureting the gas by opening valve $i'$ in pipe $i$, the pressure of vapor in the top of the still serving to force the oil up through pipe $i$ into pipe $h$, where it is met by a stream of vapor from pipe $f'$, and thereby vaporized and forced into the generator. The hot oil may also be forced into the generator without the admixture of vapor therewith, in which case valve $n$ in the vapor-pipe is kept closed; or the oil-still may be elevated, so the hot oil will flow into the generator by gravity.

The operation of making illuminating-gas in the apparatus shown in Fig. 5 is substantially the same as that above described with reference to Figs. 1 and 2, and the manipulation of the valves need only be described. While decomposing steam is admitted below the grate, and admitting oil-vapor at the base of the fixing-chamber the lower cone-valve is closed, upper cone-valve, $u$, is opened, and valve $m''$ in pipe M' is open, and the fixed illuminating-gas passes down through the tubes of the water-heater, and thence through pipe M' into the base of the scrubber, and after passing through the scrubber goes to the purifiers and holder.

In the manufacture of water-gas simply for use as fuel the steam is admitted into chamber Y' at the top of the superheater, and is passed down through the superheater, then down into the incandescent fuel, where it is decomposed, and the resulting gases pass out below the grate through pipe 1, cone-valve $p$ being open, through pipe 1' into the base of the water-heater. Valve $m''$ is closed and valve $m'$ opened, so that the gas is compelled to pass up the tubes of the heater and down pipe M into the base of the scrubber.

In the apparatus shown in Fig. 8 steam may be decomposed by passage either up or down through the fuel. The uncarbureted water-gas is to be passed to a separate holder.

By connecting the oil-vapor pipe near the bottom of the fuel-chamber in the apparatus shown in Fig. 9 I can conveniently make by successive operations both water-gas and hydrocarbon gas in the same body of fuel, and the two kinds of gas may be mixed in the same holder, or may be stored separately, as desired. For this purpose the fuel is first raised to incandescence. Steam is then decomposed by passage up through the incandescent fuel, and the resulting water-gas is passed off through the boiler to the scrubber and holder. The decomposition of steam is continued ten minutes (more or less) till the fuel is reduced to the proper temperature for generating hydrocarbon gas without danger of carbonizing and wasting the oil or oil-vapor. Then the steam is shut off, or nearly so, and oil-vapor is admitted as long as it will be properly converted into a fixed gas, and the gas is conducted to the holder containing water-gas or to a separate holder. The two kinds of gas may be drawn from separate holders and mixed in suitable proportions by a mixing-meter.

The oil may be sprayed into the fuel-chamber by a jet of steam or a jet of water-gas under pressure.

A generator composed simply of the fuel-chamber and the boiler, and having connecting-pipes for steam and oil, as described, and operated as last described, is adapted for generating heating or illuminating gas for factories or small towns on an economical scale.

Bituminous coal may be used in the fuel-chamber of any of the forms of apparatus shown, and the masses of caked coal or coke formed can be conveniently broken up by bars inserted through the stoke-holes $t$.

By carrying the water-jacket up the whole height of the cupola and placing the communicating boiler on top, covered by suitable non-conducting material, as usual, the heat is better utilized and loss by radiation prevented. The apparatus is made more compact and convenient and can be more economically constructed and operated.

Having described my invention, what I claim, and desire to secure by Letters Patent, is—

1. A gas-generating cupola having a fuel and steam decomposing chamber and a fixing-chamber, in combination with an oil still or vaporizer, separate means for heating it, and valved pipes connecting such still with the generating cupola, whereby the water-gas may be mixed with the oil-vapor and the mixture passed through the fixing-chamber.

2. The combination, with a gas-generating cupola-furnace having a fuel-chamber and a fixing-chamber, of an oil still or vaporizer provided with means for heating it and storing vapor under pressure, and a valved vapor-pipe connecting such still with the cupola generator, for the purpose described.

3. In combination with a cupola generator, the separate oil still or vaporizer, means for heating it, a vapor-pipe leading from the top of the dome, an oil-pipe leading from near the bottom of the still, and a pipe connecting both of such pipes with the generating-cupola, for the purpose described.

4. In combination with the generating-cupola, the separate oil-still, valved pipes connecting them adapted to admit the hot oil or vapor to the generator, and a vent-pipe provided with a safety-valve connected with the still and a condenser, for the purpose described.

5. In combination with a gas-generating furnace, a water-jacket surrounding it, and a tubular steam-boiler mounted on top of the furnace and water-jacket and freely communicating with the latter, for the purpose described.

6. The gas-generating cupola having a fuel-chamber at the base and a fixing-chamber above, in combination with a water-jacket surrounding them both, and a steam-boiler mounted above the fixing-chamber and water-jacket and freely communicating with such jacket, for the purpose described.

7. In combination with a gas-generating chamber, a fixing-chamber having a filling of brick formed of perforated arches, for the purpose described.

8. In combination with a gas-generating chamber, a fixing-chamber provided with brick arches placed one above the other and having perforations or passages falling in vertical lines in the successive arches, whereby numerous vertical passages are formed from bottom to top of the fixing-chamber, for the purpose described.

9. A fixing-chamber for gas-generators formed of perforated brick laid in arches one above the other, so as to form vertical passages through the chamber, for the purpose described.

10. In combination with a gas-generating furnace, the water-jacket forming a portion of the walls thereof, and the tubular bars $a$, connecting opposite portions of such jacket near its base and forming the grate, for the purpose described.

11. In combination with a gas-generating furnace, the water-jacket having in its outer casing near the base series of openings and screw-plugs, and the tubular grate-bars $a$, connecting opposite portions of such jacket and having their ends adjacent to the said openings and plugs, for the purpose described.

12. The generating-furnace having a water-jacket and a steam-boiler, in combination with a water-heater having a water-supply pipe, a pipe connecting the heater with the water-jacket, and an air-escape pipe connecting the heater with the upper part of the boiler, for the purpose described.

13. The generator connected at top and bottom to the water-heater by pipes having interposed hydraulic boxes into which the pipes from the generator dip, in combination with the cone and cup valves connected to close the ends of such dip-pipes.

14. In combination with the hydraulic seal-box, the outlet-pipe of the generator projecting down into such box, and a cone-valve having an annular cup adapted to close the end of the projecting pipe and having an operating-rod.

15. The generator and the water-heater connected together at top and bottom by valved pipes, in combination with the scrubber, pipe M', having a valve connecting the base of the heater with the base of the scrubber, and having its end bent down in the scrubber to dip into a sealing-liquid, and pipe M, having a valve connecting the top of the heater with pipe M', for the purpose described.

16. The cupola gas-generator having the fuel-chamber at the base, the fixing-chamber above, and the steam-boiler at the top, in combination with blast-pipe V, connecting with the ash-pit, blast-pipe V', connecting with the top of the fuel-chamber, and blast-pipe V², connecting with chamber Y', between the fixing-chamber and boiler, for the purpose described.

17. In combination with the cupola, the air-blast pipe V', having its inner end perforated, and the oil-pipe $h$, projecting into the blast-pipe and discharging near the perforated end thereof, for the purpose described.

In testimony whereof I affix my signature in presence of two witnesses.

JOHN L. STEWART.

Witnesses:
H. F. REARDON,
C. DUBREE.